Figure 1:
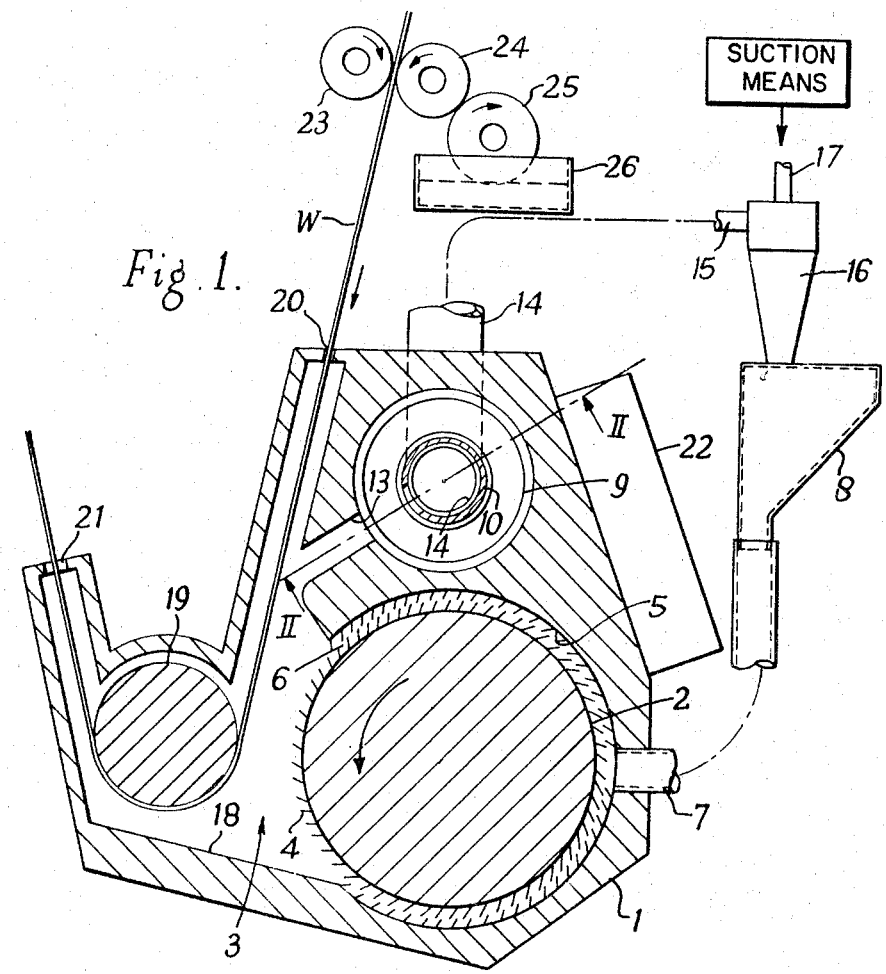

May 2, 1967  A. K. McCOMBIE  3,316,876
APPARATUS FOR APPLYING BRONZE POWDER TO A WEB
Filed Aug. 1, 1963

INVENTOR
Alan K. McCombie
BY
Watson, Cole, Grindle & Watson
ATTORNEYS

United States Patent Office 3,316,876  
Patented May 2, 1967

3,316,876  
APPARATUS FOR APPLYING BRONZE POWDER TO A WEB  
Alan Keith McCombie, London, England, assignor to The Molins Organisation Limited, a British company  
Filed Aug. 1, 1963, Ser. No. 299,280  
Claims priority, application Great Britain, Aug. 17, 1962, 31,680/62  
7 Claims. (Cl. 118—50)

This invention concerns improvements in or relating to bronzing, and in particular to a method of and apparatus for applying particles of bronzing material to an article to be bronzed.

The term "bronzing" where used herein is to be understood as meaning that process whereby finely divided particles of bronzing material are applied to an article so as to adhere to desired parts thereof, and by the expression "bronzing material" is meant any material which, in the form of finely divided particles, is suitable for use in bronzing. In particular it is to be understood that the term "bronzing material" includes suitable material other than bronze.

In the manufacture of some cigarettes, finely divided particles of bronzing material are applied to a cigarette-paper web so as to adhere to desired parts thereof, the web then being wrapped about a tobacco filler to form a continuous rod which is severed to produce individual cigarettes, each of which has a portion of its wrapper bronzed. The bronzed portion of the wrapper is normally in the form of a pattern or letters, the bronzing material often being gold in colour and the bronzing providing a glistening effect.

Bronzing apparatus used in the manufacture of such cigarettes frequently comprises brush rollers which are arranged to brush bronzing material on to the web, the said desired parts of which have previously had adhesive applied thereto, so that the finely divided particles adhere to those parts to form a bronzed impression, and further brush rollers to remove excess bronzing material from the web. When using such apparatus, however, it sometimes happens that the surplus bronzing material is not completely removed by the appropriate brush rollers, so that it sometimes becomes dislodged from the web as the latter passes through parts of the cigarette forming mechanism, which can often lead to undesirable deposits of bronzing material in parts of the mechanism, and further, ineffective removal of surplus bronzing material can sometimes cause an undesirable, visible smear along a finished cigarette. Also the brushing action can sometimes cause removed surplus particles of bronzing material to be clustered around particles of adhesive, so that coarse lumps of bronzing material which are unsuitable for re-use are sometimes formed.

According to the present invention there is provided a method of bronzing, comprising the steps of applying adhesive to desired parts of an article (e.g. a continuous web of material), forming a dispersion in air of particles of bronzing material, and passing the article through the dispersion so that particles adhere to said desired part.

Further according to the invention there is provided bronzing apparatus, comprising a chamber through which an article (e.g. a continuous web of material) is passed, its surface having an adhesive coated part, and means to disperse within the chamber particles of bronzing material, which are capable of adhering to the said adhesive coated part.

The apparatus may include means to feed particles of bronzing material to a channel formed between parallel surfaces of a rotatable element and a supporting member, each surface being provided with a pile formed by fibers inclined in one direction relative thereto, and motive means to cause the rotatable element to move in one direction only with the fibres of one pile sliding over those of the other, so that the particles of bronzing material are carried through the channel in the pile of the rotatable element and are projected into the chamber to form the dispersion therein. The motive means may cause the member to vibrate so that the element rotates relatively thereto.

The said member may further define the chamber, its vibration assisting to form the dispersion. The means to feed particles to the channel may comprise a flexible pipe leading from a reservoir to the channel, the vibration of the member acting to vibrate the pipe and to assist the passage of the particles therethrough. There may be provided an outlet to the said chamber and means to apply suction at the outlet so as to draw particles from the chamber and to achieve a flow of bronzing material through the chamber. Particles of bronzing material drawn from the chamber may be returned to the reservoir.

The member may be shaped to provide the chamber was a sloped floor, the rotatable element being positioned adjacent its lower end, so that particles settling on the floor are assisted to move therealong assisted by the vibration of the member and to come within the range of action of the element which thereby recirculates them.

The member may be resiliently mounted on a fixed bracket about which it is capable of vibrating. The amplitude of vibration may be variable so that the speed of rotation of the element is regulatable and hence the concentration of bronzing material in the dispersion.

Means to feed a continuous web may comprise a guide member (e.g. a roller) connected to the member and positioned in the chamber so that the web is movable in a curved path about the guide member, whereby the vibration of the guide member with the member and the movement of the web in a curved path cause surplus particles to be dislodged from the web.

Figure 2:
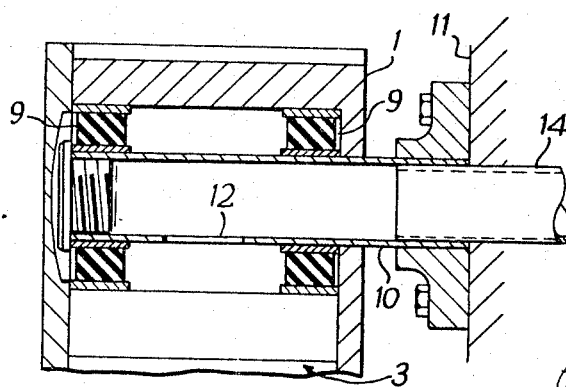

Apparatus in accordance with the present invention will now be described by way of example with reference to the accompanying drawing, in which:

FIGURE 1 is a section through bronzing apparatus fitted on a continuous rod cigarette-making machine, FIGURE 2 is a section on the line II—II of FIGURE 1.

Referring to FIGURE 1, the apparatus includes a light, rigid member 1, which is shaped to accommodate a rotatable element in the form of a narrow drum 2, and to define a chamber indicated generally by the reference 3. The drum 2 is provided with a pile 4 formed by fibres inclined in one direction to the cylindrical surface of the drum, and is supported adjacent to an arcuate surface 5 of the member 1 which is also provided with a pile 6 formed by fibres inclined in one direction to the surface 5. The surface 5 is parallel to the cylindrical surface of the drum 2 so that a channel is formed between them, the fibres of the piles 4 and 6 extending across the channel and being inclined in the same direction to a normal to the two parallel surfaces. The cylinder 2 is thus supported by the member 1 with the pile 4 resting against the pile 6.

A flexible pipe 7 fitted into the member 1 so as to lead into the channel between the surface 5 and drum 2, connects the channel to a fixed reservoir 8 for holding particles of bronzing material.

Referring also to FIGURE 2, the member 1 is mounted on two resilient rubber bushings 9 which are concentric with a hollow shaft 10 attached to a fixed bracket 11. The hollow shaft 10 is provided with an aperture 12 which communicates through an outlet 13 with the chamber 3, and a pipe 14 connects the hollow centre of the shaft 10 with a pipe 15 which leads into a cyclone 16. A source of suction communicates with the cyclone 16 through a pipe 17, while the cyclone 16 is positioned directly above the reservoir 8.

The member 1 is shaped to provide the chamber 3 with a sloped floor 18 which is inclined downwardly towards the lower part of the surface 5 beneath the drum 2 for a purpose to be described later.

A guide roller 19 is mounted on the member 1 so as to lie across the chamber 3. An inlet slot 20 and outlet slot 21 are provided in the member 1 so that a cigarette-paper web W can be fed through the chamber 3 by passing through the inlet slot 20, about the roller 19 and through the outlet slot 21.

Mounted on the member 1 is an armature 22 in association with which there is provided a vibrator coil (not shown).

The cigarette-paper web W is fed between a pressure roller 23 and an impression roller 24 to which adhesive is transferred by means of a transfer roller 25 from an adhesive-containing tank 26. The impression roller 23 thus applies adhesive to those parts of the web which are to be bronzed, and the web then passes through the chamber 3. In operation the vibrator coil and armature 22 act to vibrate the member 1, which thus executes small amplitude oscillations about the rubber bushings 9. Bronzing powder supplied to the reservoir 8 is fed through the feed pipe 7, the vibration of the member 1 acting to shake the flexible pipe and assist the passage of the powder, which is then received between the peripheral surface of the drum 2 and the arcuate surface 5. Vibration of the member 1 causes the drum 2 to rotate anti-clockwise as viewed in FIGURE 1 by interaction of the piles 4 and 6. Bronzing powder is thus conveyed in the pile 4 of the drum 2 through the channel between the drum 2 and the surface 5 to be projected into the chamber 3 in which the particles of bronzing material become dispersed, the vibration of the member 1 assisting to create a dispersion of the particles in the air in the chamber. Suction applied through the pipe 17 acts through the pipes 15 and 14 and through the hollow shaft 10. Bronzing powder is thus suctionally drawn from the chamber 3 through the outlet 13, and enters the hollow shaft 10 through the aperture 12 to be drawn through the pipes 14 and 15 into the cyclone 16. The rubber bushes act as an air-tight connection between the member 1 and the shaft 10. The bulk of the bronze powder carried in the airstream is precipitated in the cyclone 16 to be returned to the reservoir 8, and remaining powder drawn in the air stream from the cyclone is extracted by means of a filter box (not shown). By this arrangement a constant flow of bronzing powder through the chamber 3 can be achieved.

The paper web W passing through the chamber 3 contacts the fine dispersion of powder in the air, and bronzing powder adheres to those parts of the web to which adhesive has been applied, to provide a bronzed impression. As the web W travels about the roller 19, excess bronzing powder carried by the web is dislodged on account of the sharp bend about the roller 19 and the vibration of the roller with the member 1. Bronzing powder which is so dislodged from the web, together with any further powder which may settle on the floor 18 of the chamber 3, is caused to move along the sloping floor, on account of the vibratory motion, to come within the range of action of the rotating drum 2, which recirculates the powder by carrying it in the pile 4 through the channel between the periphery of the drum and the surface 5.

The amplitude of vibration of the member 1 can be regulated, so that the speed of rotation of the drum 2, and hence the concentration of bronzing powder dispersed in the chamber 3, can be varied. The deposit of bronzing powder on the desired parts of the web can thus be controlled according to requirements.

If desired, the roller 19 described above can be replaced by a rod of suitable material, such as polytetrafluoroethylene which is fixed to the member 1 to lie across the chamber 3.

What I claim as my invention and desire to secure by Letters Patent is:

1. Bronzing apparatus for applying particles of bronzing material to an adhesive coated web, comprising a member defining first and second chambers, said second chamber having a cylindrical wall and an outlet in said cylindrical wall communicating with said first chamber, resilient means for supporting said member, means for vibrating said member, means to feed said web through said first chamber, a rotatable cylinder within said second chamber, the cylindrical surface of said rotatable cylinder being spaced from the cylindrical wall of said second chamber to define a channel therebetween, pile material covering the opposed surfaces of both said cylinder and said cylindrical wall, the fibers of said pile material covering both said surfaces being inclined in the same arcuate direction, and means to feed said particles between said two pile covered surfaces, whereby vibration of said member causes said cylinder to rotate delivering and dispersing said particles through said outlet in said cylindrical wall into said first chamber.

2. Apparatus as claimed in claim 1 wherein said means to feed particles between said two pile covered surfaces comprises a flexible pipe, said apparatus further comprising a reservoir, said flexible pipe being connected to said reservoir whereby the vibration of said member caused by said vibrating means vibrates said flexible pipe to assist the passage of said particles therethrough from said reservoir to said pile covered surfaces.

3. Apparatus as claimed in claim 1 wherein said first chamber has a floor said floor sloping towards said rotatable cylinder whereby particles settling on said floor move therealong assisted by the vibration of said member towards and into contact with the pile covered surfaces of said rotatable cylinder and cylindrical wall and are recirculated between said pile covered surfaces and dispersed through said outlet in said cylindrical wall into said first chamber.

4. Apparatus as claimed in claim 1 wherein said means to feed said web through said first chamber comprises a guide member positioned in said first chamber whereby the web is movable in a curved path about the guide member causing surplus particles to be dislodged from the web.

5. In apparatus for dispersing particulate material to form a cloud, a housing having therein a chamber having a cylindrical wall and an outlet in said cylindrical wall, resilient means for supporting said housing, means for vibrating said housing, a rotatable cylinder within said chamber, the cylindrical surface of said rotatable cylinder being spaced from the cylindrical wall of said chamber to define a channel therebetween, pile material covering the opposed surfaces of both said cylinder and said cylindrical wall, the fibers of said pile material covering both said surfaces being inclined in the same arcuate direction, and means to feed said particulate material between said two pile covered surfaces, whereby vibration of said housing causes said cylinder to rotate delivering and dispersing said particulate material through said outlet.

6. Apparatus as claimed in claim 1, further comprising an outlet to the first chamber and means to apply suction at the outlet so as to draw excess particles from the first chamber and to achieve a flow of bronzing material through said first chamber.

7. Apparatus as claimed in claim 6 further comprising means for returning excess particles of bronzing material drawn from the first chamber to the second chamber.

References Cited by the Examiner

UNITED STATES PATENTS

| | | | |
|---|---|---|---|
| 106,667 | 8/1870 | Crump | 118—309 |
| 209,624 | 11/1878 | Peterson et al. | 118—309 |
| 209,625 | 11/1878 | Peterson et al. | 117—31 |
| 249,835 | 11/1881 | Henry | 117—33 |
| 995,998 | 6/1911 | Bradley | 117—31 |
| 1,068,915 | 7/1913 | Moore et al. | 118—309 |
| 2,141,658 | 12/1938 | Melton et al. | 117—33 |
| 2,169,078 | 8/1939 | Waite | 117—31 |
| 2,732,775 | 1/1956 | Young et al. | 117—17.5 |
| 2,877,738 | 3/1959 | Heck. | |
| 3,152,012 | 10/1964 | Schaffert | 117—17.5 |

FOREIGN PATENTS

| | | |
|---|---|---|
| 16,987 | 1892 | Great Britain. |
| 498,833 | 1/1939 | Great Britain. |
| 507,920 | 1/1952 | France. |
| 488,105 | 1/1930 | Germany. |

WILLIAM D. MARTIN, *Primary Examiner.*

P. F. ATTAGUILE, *Assistant Examiner.*